No. 849,582. PATENTED APR. 9, 1907.
R. STEBBINS.
REGULATION OF ELECTRIC MOTORS.
APPLICATION FILED NOV. 9, 1906.
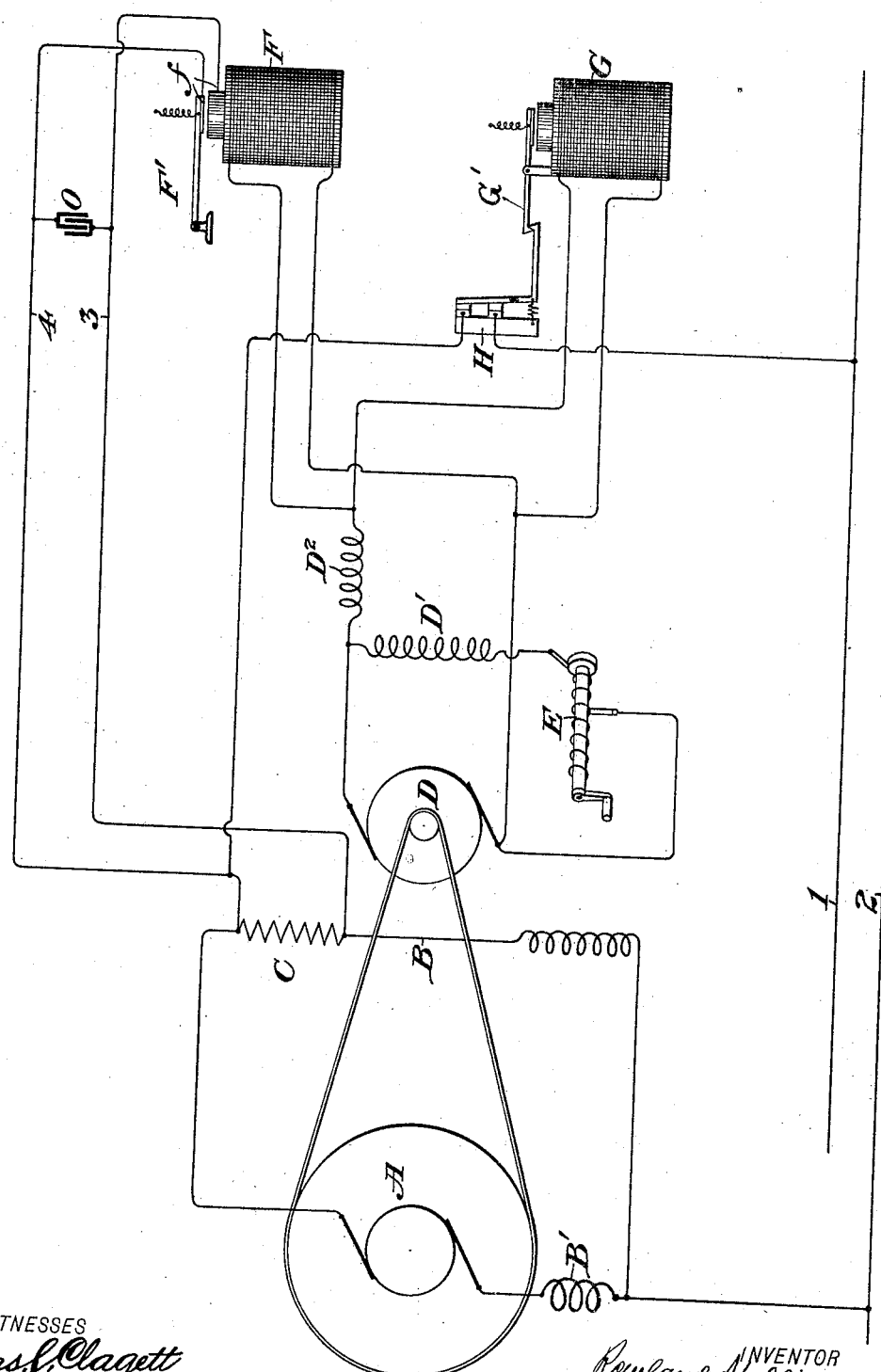
WITNESSES
Chas. F. Clagett
Anita Burke.
INVENTOR
Rowland Stebbins,
BY J. J. Johnston,
ATTORNEY

UNITED STATES PATENT OFFICE.

ROWLAND STEBBINS, OF NEW YORK, N. Y.

REGULATION OF ELECTRIC MOTORS.

No. 849,582.  Specification of Letters Patent.  Patented April 9, 1907.

Application filed November 9, 1906. Serial No. 342,651.

*To all whom it may concern:*

Be it known that I, ROWLAND STEBBINS, a citizen of the United States, and a resident of the city of New York, in the State of New York, have invented certain new and useful Improvements in Regulation of Electric Motors, of which the following is a specification.

My present invention relates to the regulation of electric motors, and has particular reference to the operation of motors driven by direct current.

It has for its object to preserve constant the speed of such motors provided with a shunt field-magnet winding within more restricted limits than any which I believe to have been attained heretofore.

Certain classes of electric machinery are required to be driven at as nearly as possible uniform speed, and these are generally driven by shunt-motors, the speed characteristic of which is quite uniform without exterior regulation. With changes of load, however, changes do occur even with shunt-motors. Some sorts of booster having compound windings and which are motor-driven are also required to have very stable speeds, as does machinery in cotton-mills and similar installations. To restrict variations which may occur, therefore, even with a well-designed shunt-motor, I arrange a regulator which consists of a small generator driven by the motor and an electromagnet in circuit with the generator which operates a short-circuiting switch connected to a substantial resistance in the field-magnet circuit of the main motor. When the speed tends to rise, the resistance is cut out, and the field is substantially strengthened, this being effected by the increased current delivered by the regulating generator-armature when its speed is increased. When the speed falls, the resistance is again included in the circuit, and the field is weakened. By certain devices, presently to be described, these effects may be produced within practically any restricted range of motor speed that may be selected.

The accompanying drawing is a diagram showing my invention as applied to any standard apparatus, the particular construction of which of course is otherwise immaterial.

In the drawing, A is the armature of the motor, which is supplied with current from the mains 12. Any usual starting or speed-determining apparatus may be included between the motor and the mains in ways well understood.

B is the shunt field-magnet circuit of the motor, connected across the brushes in the common way, and B' is its series field, a compound-wound machine being shown, though the invention is applicable, as already stated, to a pure shunt-motor, while C is a resistance serving to regulate the strength of the field, as presently described.

D is the armature of the generator used as a regulator, and D' is its shunt-field, connected through a resistance E of the potentiometer type, by which the regulation of the field may be very closely effected, this forming one of the means determining the limits within which the speed of the main motor may vary. The advantage of this form of resistance is that when the wire thereof is of substantially constant resistance per unit of length the change in the strength of the field produced by the winding D' may be almost incrementally regulated and does not proceed by steps or a greater or less amount, as in the ordinary forms of rheostat.

In order to make the field vary rapidly with small changes of output, a series coil $D^2$ is arranged upon the field-magnet of the generator, so that all of the current passing to the electromagnets F and G, presently to be described, passes also through this coil. By preference the generator will be slightly overcompounded, so as to increase the rapidity of the changes of output due to change of speed. The armatures of the motor and the regulating-generator may be upon the same shaft or they may be geared together in any convenient way; but in general I prefer to gear up the small generator so that its speed of revolution may be considerably greater than that of the main motor, and thus the generator, having only to supply current on a very restricted scale, may be quite small. In practice a properly wound and connected fan-motor is of a size well adapted for use as a regulator.

The field-magnet of the main motor should be worked below the bend of the saturation curve; but it need not contain so much iron as to be uneconomical. Preferably the field-magnet of the generator should be worked well below saturation, as this makes it more responsive to changes in speed of its armature, and under some circumstances, as where the speed regulation is to be very close indeed, the field-magnet may be laminated with good effect, since in this way it will respond substantially without lag.

F is the coil of an electromagnet of which F' is the armature. Contacts $ff$, connected by the leads 3 4 to the ends of the resistance C, form with the armature F, which carries one of them, a short-circuiting switch for the resistance.

Another part of my invention operated in conjunction with my improved speed-regulator is now to be described. The ordinary circuit-breaker H is connected in the usual manner in the main lead to the motor and opens when too large a current flows in the circuit, as is well understood. The circuit-breaker is inoperative when for any reason the current falls below normal, except in those forms in which the circuit is broken by special devices on an entire failure of current. If now with the compound-wound motor illustrated a heavy load is being operated and is suddenly thrown off, the entire effect of the series field-magnet coil B' is removed and the field greatly weakens. The shunt field-magnet winding will correct this difficulty, but takes an appreciable time to act on account of its large inductance tending to prevent a rapid change of current. Other causes of undue rise of speed, such as a broken lead to the shunt field-magnet winding, dirt upon the contacts $ff$, or the sticking of the armature F', or anything else which would prevent the proper operation of the short-circuiting contacts, are also provided for by the operation of this part of my invention.

The circuit-breaker H is provided with an auxiliary coil G, which operates the trip G'. This coil is arranged in series with the series winding upon the field-magnet of the regulating-generator D. If now the output of the generator increases, due to change in speed, beyond such an amount as can be taken care of by the regulating-magnet F, the coil G (which may be calibrated in the usual manner by adjusting the tension of the spring holding the trip closed) will overcome the resistance of the spring and operate the trip G', thus opening the circuit-breaker and preventing a disastrous rise of speed.

The principle of operation of my invention is, in brief, greatly increasing the field magnetism of the motor whenever it tends to run above its normal speed and greatly diminishing the field whenever the motor lowers its speed. Having this in view, it is best to wind the field-magnet so that the magnetization when the resistance is cut out is slightly above that at which the normal speed of the motor would be obtained. This gives an immediate response to change of condition caused by the cutting out of the resistance, and in combination with the compound winding of the generator (which may be overcompounded with good effect) causes the contacts $ff$ to be in a constant state of vibration, the net result of which is to keep the motor at very nearly constant speed.

The usual arrangement for adjusting the positions of the armature F and the tension of its spring may be employed as an additional means determining the limits within which the speed of the motor may vary. These devices, however, are well understood and require neither description nor illustration.

Having thus described my invention, what I claim, and wish to protect by Letters Patent of the United States, is—

1. The combination, with a continuous-current electric motor having a shunt field-magnet winding, and the speed of which is to be maintained substantially constant, of a resistance in series with the field-magnet winding and of such amount that the change in the field produced by its withdrawal or insertion is greater than is required to correct variations of motor speed; and means for inserting or withdrawing the entire resistance at once, such means responsive to changes in the motor speed.

2. The combination, with an electric motor to be operated at constant speed, of a field-magnet winding, a resistance in circuit therewith of amount such that the change in the field caused by its insertion or withdrawal is greater than is required to correct variations of the motor speed; an electrically-operated switch for cutting in or cutting out the resistance, and means, responsive to changes in the motor speed, for cutting in the entire resistance at once as the speed falls and for so cutting it out as the speed rises.

3. The combination, with an electric motor provided with a field-magnet winding and a resistance in circuit with said winding, of a switch having contacts and connections for shunting the resistance; and a generator rotated by the motor, the current from which operates the switch.

4. The combination, with a motor provided with a shunt field-magnet winding, of a resistance in series with such field-magnet winding, a switch having contacts and connections for shunting the resistance, an electromagnet controlling the switch, and a generator operated by the motor, the current from which controls the electromagnet.

5. The combination, with a motor having a shunt field-magnet winding, of a resistance in series with said winding, a switch having contacts and connections for shunting the resistance at desired times, the resistance being of an amount in excess of that required to compensate for variations in the desired speed of the motor, and electrical means, responsive to such changes in speed, for operating the switch at desired times.

6. The combination, with a motor having a shunt field-magnet winding, of a resistance in series with said winding of such amount as to cause by its insertion or withdrawal a change in the field in excess of that required to control the speed of the motor; means for shunting the resistance, an electromagnet for operating such means, and a generator driven by the motor, the changes in the output of which due to change in speed cause the electromagnet to open and close the shunt.

7. The combination, with a motor having a shunt-winding, of a generator driven by the motor, a resistance in circuit with a shunt field-magnet winding, a switch for inserting or cutting out the resistance, and an electromagnet in circuit with the generator and controlling the switch.

8. In combination with a motor, having a shunt-winding, a generator driven by the motor, means for determining the output of the generator at given speed, a resistance in the shunt field-magnet circuit of the motor; and means, responsive to changes in the generator output due to change in speed, for cutting out or inserting the resistance.

9. The combination with a motor having a shunt field-magnet winding and the speed of which is to be maintained substantially constant, of a generator driven thereby and so geared that its speed changes with and over wider limits than that of the motor; and means for changing the motor speed, inversely responsive to the changes of speed of the generator.

10. The combination, with a shunt-wound motor, of a compound-wound generator driven by the motor and so geared as to rotate faster than the motor revolves; a resistance in the motor field-magnet circuit, an electromagnet in circuit with the generator-armature, and a switch controlling the resistance and operated by the electromagnet.

11. The combination, with a motor having a shunt field-magnet winding, of a generator driven by the motor and having a field-magnet winding with a resistance of the potentiometer type in circuit therewith, by which the strength of the field may be incrementally regulated; with means controlled by changes in the output of the generator for varying the field of the main motor inversely as the output of the generator changes; whereby the increase of speed of the generator retards the main motor, and the diminution of the speed of the generator accelerates the main motor.

12. The combination, with a motor and a regulator therefor arranged to preserve the motor speed constant; a generator driven by the motor, the changes in the output of which operate the regulator, of a circuit-breaker in the motor-lead and means for causing the changes of the generator-current to operate the circuit-breaker when the regulator fails to operate.

In witness whereof I have hereunto set my name in the presence of two witnesses.

ROWLAND STEBBINS.

Witnesses:
T. J. JOHNSTON,
ANITA BURKE.